April 3, 1956 H. J. McCREARY 2,740,948
ELECTRONIC RINGING FREQUENCY GENERATOR
Original Filed July 20, 1950
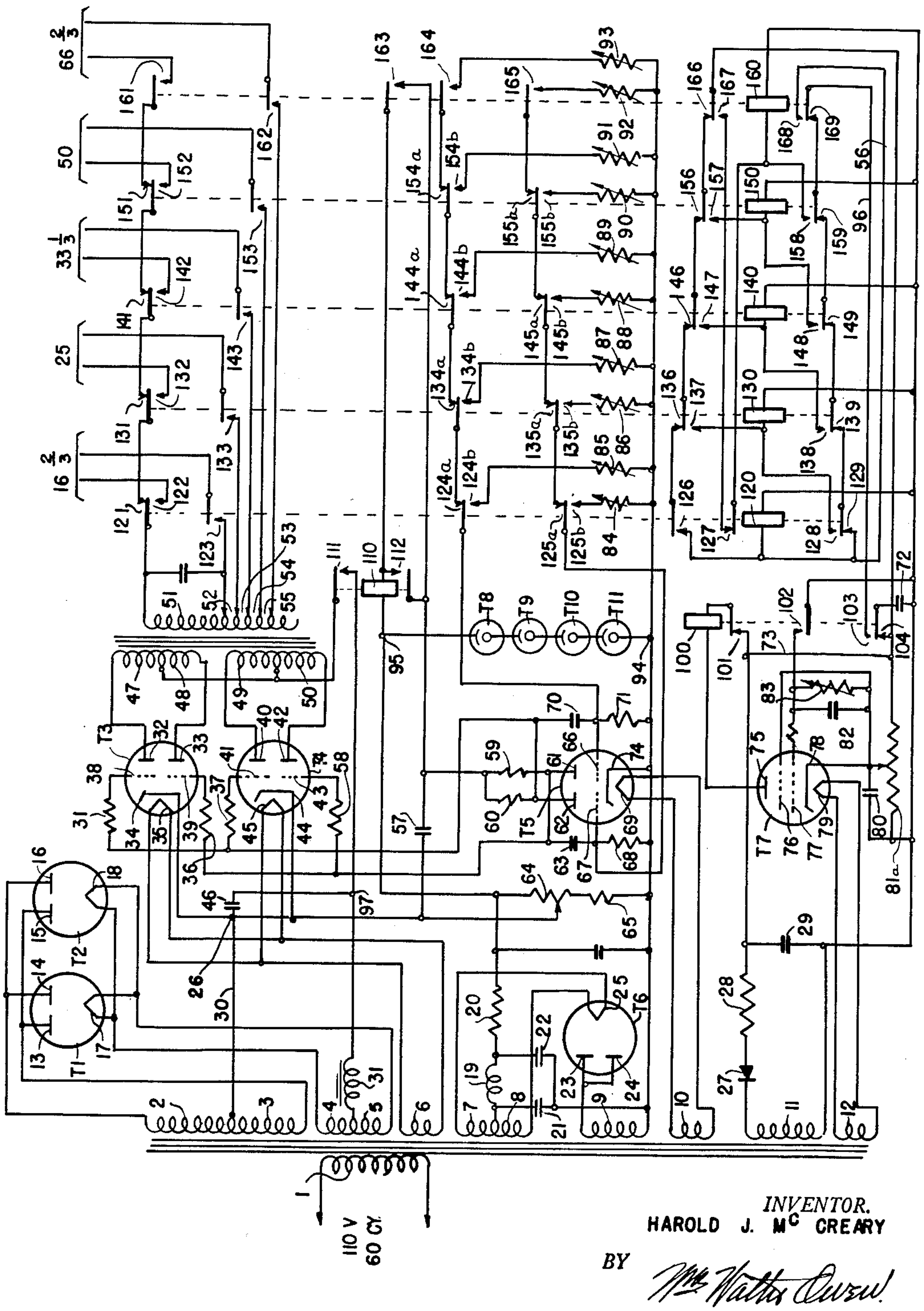
INVENTOR.
HAROLD J. McCREARY
BY McWatters Owen
ATTY.

United States Patent Office 2,740,948
Patented Apr. 3, 1956

2,740,948

ELECTRONIC RINGING FREQUENCY GENERATOR

Harold J. McCreary, Lombard, Ill., assignor to Automatic Electric Laboratories, Inc., Chicago, Ill., a corporation of Delaware Original application July 20, 1950, Serial No. 174,943, now Patent No. 2,674,734, dated April 6, 1954. Divided and this application October 8, 1952, Serial No. 313,654

4 Claims. (Cl. 340—168)

The present invention relates in general to telephone ringing generators and more particularly to such generators employing electronic means exclusively, and is a division of my prior application filed July 20, 1950, Serial No. 174,943, now U. S. Patent No. 2,674,734 dated April 6, 1954.

It is an object of the invention to provide an improved electronic ringing generator system that is simple in arrangement, economical in manufacturing, and efficient in operation.

It is another object of the present invention to provide means for maintaining the output frequency independent of the load.

A feature of the present invention is the provision of only one oscillator automatically changing frequency to produce five different ringing frequencies.

Another feature of the invention is in operating the power tubes with such a load that less than half their rated plate current flows in order to insure longer tube life.

Another feature of the invention is in providing power tubes and rectifier tubes in parallel so that in case of failure of one, the other will adequately carry the load for maintaining steady continuous service.

Other objects and features will be evident and a complete understanding of the operation may be had from a perusal of the description in conjunction with the accompanying drawing, Fig. 1, which shows the entire system.

Briefly explained, the invention comprises a novel relay counting circuit that automatically changes (once per second) the frequency determining component, namely, the grid resistance, of a well-known plate coupled multivibrator thereby effecting oscillations at five different ringing frequencies. The output from the multivibrator drives a push-pull power amplifier which supplies the five output ringing circuits one at a time. In order to render the system more convenient to describe and understand, it is essentially divided into three more or less separate components; the relay counting circuit covering the bottom third of the drawing, the multivibrator the middle third and the power amplifier the upper third. The counting circuit, including a selenium rectifier 27 and a thyratron tube T7, such as an RCA 2050, causes, as will be hereinafter described, the counting relays 120, 130, 140, 150 and 160 to sequentially operate. These relays cause the introduction of various resistance values into the grid circuits of the multivibrator and also cause the output of the power amplifier to be connected to the proper ringing circuit. Rectifier tube T6, such as an RCA 5Z3, along with other standard power supply components and voltage regulating tubes T8, T9, T10 and T11, such as RCA 0A2's, furnish the necessary steady direct voltage to operate the multivibrator. The multivibrator tube T5 is an RCA 6N7 in the present embodiment. Rectifier tubes T1 and T2, such as RCA 5Z3's supply the necessary high direct voltage to operate the power amplifier. The power amplifier tubes, T3 and T4, connected in parallel push-pull, are RCA 6AS7G's in the present embodiment and are driven by the multivibrator. The output of this amplifier is connected to one of the five different ringing circuits corresponding to the ringing frequency the multivibrator is producing at that time. Hereinafter current flow and electron flow will be considered synonymous—i. e., flowing from a point of lower potential (negative) to a point of higher potential (positive).

Having briefly described my invention, a detailed description thereof follows immediately hereinafter.

The relay counting circuit will be considered first. When the system is turned on, primary winding 1 supplies power to all the secondaries including, of course, winding 12. This winding will supply 6.3 volts to heat filament 79 of thyratron tube T7. Winding 11 in the meantime will charge condenser 29 through selenium rectifier 27 and resistor 28 causing a positive potential to appear on the top and negative on the bottom. The number of turns on winding 11 and the value of the resistance of 27 and 28 will be so adjusted that condenser 29 will be maintained at 100 volts. It should be noted at this time that condenser 72 will likewise be charged to 100 volts as it is connected directly in parallel with condenser 29 through contacts 104 and conductor 73. When the filament is sufficiently heated so that conduction may take place, the direct voltage across condenser 29 will cause electrons to flow over the following path: from the bottom of condenser 29 and winding 11, resistance 81*a*, cathode 78, plate 75, pulse relay 100, pulse relay contacts 101, to the top of condenser 29 and winding 11. Pulse relay 100 therefore energizes and, as it is so mechanically adjusted that contacts 102 operate first, causes a negative voltage from the lower terminal of condenser 29 to be placed on the upper terminal 82. Contacts 103 then close and as condenser 72 had been previously charged to 100 volts, with the positive potential on the top, said condenser 72 will discharge over the following path: from the bottom of condenser 72, relay 120, contacts 129, 139, 149, 159, 169, conductor 96, contacts 103 to the top of condenser 72. Relay 120 thus operates and locks up over the following path: bottom of condenser 29 and winding 11, relay 120, contacts 126, 136, 146, 156, 166, conductor 73, to the top of condenser 29 and winding 11. Other functions of relay 120 will be hereinafter explained. Contacts 101 finally operate and open the plate voltage supply circuit, as hereinbefore described, and also deenergizes relay 100. Tube T7 therefore ceases to conduct. Contacts 101 make again, closing the plate circuit; but once tube T7 is cut off, grid 77 assumes control. It will be remembered that upon the operation of contacts 102 a negative voltage from the bottom of condenser 29 is placed upon the top of condenser 82 and, of course, grid 77. It should be noted here that there is an electron flow from the bottom of condenser 29 and winding 11 through resistances 81*a* and 81*b*, conductor 73 to the top of condenser 29 and winding 11. This, of course, places cathode 78 at a positive potential with respect to the bottom of condenser 29. Now inasmuch as condenser 82 is initially charged to that negative potential of condenser 29, grid 77 will be negative with respect to cathode 78. Therefore tube T7 will not again conduct until condenser 82 discharges. This will occur after relay 100 is deenergized with the resultant opening of contacts 102. Condenser 82 will discharge through resistance 83 at a rate dependent upon the time constant of the two components. The voltage on grid 77 will thus rise (become less and less negative with respect to cathode 78); and, if condenser 82 and resistance 83 are proportioned correctly (one micro-farad and 250,000 ohms in the present embodiment), one second will elapse before the plate voltage on plate 75 will regain control. The foregoing cycle will again repeat itself over and over again with a pulse of current, resulting from the discharge of condenser 72, traversing conductor 96 once per second.

As explained hereinbefore, relay 120 operates and locks up responsive to the first pulse. Contacts 128 will thus be closed so that the second pulse will operate relay 130 over the following path: bottom of condenser 72, relay 130, contacts 128, 139, 149, 159, 169, conductor 96, contacts 103, to the top of condenser 72. Relay 130 therefore operates responsive to the second pulse or second cycle and locks up over the following circuit: bottom of condenser 29 and winding 11, relay 130, contacts 137, 146, 156, 166, conductor 73 to the top of condenser 29 and winding 11. Relay 130 also, by opening contacts 136, opens the locking circuit for relay 120, said circuit having been traced hereinbefore. Relay 120, of course, therefore falls back. Relay 130 closes contacts 138 so that the third pulse will operate relay 140 over the following path: bottom of condenser 72, relay 140, contacts 138, 149, 159, 169, conductor 96, contacts 103 to the top of condenser 72. Relay 140 therefore operates responsive to the third pulse and locks up over the following circuit: bottom of condenser 29 and winding 11, relay 140, contacts 147, 156, 166, conductor 73 to the top of condenser 29 and winding 11. Relay 140, by opening contacts 146, opens the locking circuit for relay 130, said circuit having been traced hereinbefore. Relay 130 therefore restores. Relay 140 by closing contacts 148 causes the fourth pulse to operate relay 150 over the following path: bottom of condenser 72, relay 150, contacts 148, 159, 169, conductor 96, contacts 103 to the top of condenser 72. Relay 150 locks up over the following path: bottom of condenser 29 and winding 11, relay 150, contacts 157, 166, conductor 73 to the top of condenser 29 and winding 11. Relay 150 also, by opening contacts 156, opens the locking circuit for relay 140, said circuit having been traced hereinbefore. Relay 140 therefore falls back. Relay 150, by closing contacts 158, causes the fifth pulse to operate relay 160 over the following path: bottom of condenser 72, relay 160, contacts 158, 169, conductor 96, contacts 103 to the top of condenser 72. Relay 160 locks up over the following circuit: bottom of condenser 29 and winding 11, relay 160, contacts 127, 167, conductor 73, to the top of condenser 29 and winding 11. Relay 160, by closing contacts 168, transfers conductor 96 to relay 120 so that the sequence of operation of the counting relays may once again occur. The second operation of relay 120 will thus be effected over the following circuit: bottom of condenser 72, relay 120, conductor 56, contacts 168, conductor 96, contacts 103 to the top of condenser 72. Relay 120, by opening contacts 127, opens the locking circuit for relay 160, said circuit having been traced hereinbefore. Relay 120, by closing contacts 128, causes the succeeding pulse to operate relay 130, over a circuit previously traced. This sequence of operation will of course continue. Thus it is seen that only one counting relay operates at a time in sequence, and then remains operated for one full second.

It will be noted that during the first five pulses neither the multivibrator nor the power amplifier is operating. The plate voltage circuits to both stages are open, as will be hereinafter described. The filaments 17 and 18 of the rectifier tubes T1 and T2 meanwhile are heated from the current transformed over to winding 4 and 5. Also winding 6 supplies filament voltage for power amplifier tubes T3 and T4; winding 7 and 8 supplies filament voltage for rectifier tube T6; and winding 10 supplies filament voltage for multivibrator tube T5. This provision for adequately heating the filaments before the plate voltage is applied insures a longer life for a tube, as is well-known in the art.

The plate voltage supply for the multivibrator is produced by a conventional rectifying and filtering circuit. Rectifier tube T6 of course conducts only in one direction so that the direct voltage produced across bleeder resistance 64 and 65 is positive at the top and negative at the bottom. Filtering condensers 21 and 22 charge during the half cycle that rectifier tube T6 conducts and discharges through the bleeder resistor 64 and 65 when tube T6 is not conducting. Choke 19 builds up a magnetic field when tube T6 is conducting. The field collapses as the conduction decreases, tending to keep a constant flow of current in the same direction through the bleeder resistor 64 and 65 and the load. T8, T9, T10 and T11 are well-known voltage regulating tubes and, as they are placed in parallel with the bleeder resistor, maintain the power supply voltage constant. The number of turns of winding 9 and the electrical values of the other rectifying and filtering components are so adjusted that a voltage of 600 volts appears across the regulating tubes—i. e., from (negative) at point 94 to (positive) at point 95. It has been found that with this regulating circuit the input voltage impressed across primary winding 1 can vary from 90 to 130 volts without an appreciable change in the direct voltage output across the regulating tubes.

The multivibrator itself, as mentioned previously, is of the conventional plate coupled type. This is the basic free-running circuit and is nothing more than a simple two-stage resistance-capacitance coupled amplifier with the output of the second stage coupled through a condenser to the grid of the first stage. Since the signal applied to the grid of a resistance-capacitance coupled amplifier is reversed in phase in the output, the output of the second stage is in phase with the input to the first, as each stage reversed the polarity of its input. Because the output of the second stage is of the proper polarity to reinforce the signal to the first tube, oscillations can take place. Now returning to the operation of the counting relays, it can be seen from the drawing that responsive to the operation of relay 160, contacts 163 close and connect point 95, through time delay relay 110, contacts 163, plate resistors 59 and 60, to plates 61 and 62 of multivibrator tube T5. It will be remembered that point 95 is at a positive 600 volts with respect to point 94 and as the cathode 74 of multivibrator tube T5 is connected directly to point 94 there will initially be a potential difference of 600 volts between the plates 61 and 62 and cathode 74. Time delay relay 110 also energizes at this time and locks itself up through contacts 112. Plate voltage is thus connected to multivibrator tube T5 through contacts 112 and will, of course, remain after relay 160 deenergizes, opening contacts 163.

When the plate power supply voltage is applied to this multivibrator, electrons begin to flow in the plate circuits. If the two halves of the circuit are alike, the conduction through both plate resistors 59 and 69 may be nearly equal. However, a perfect balance is impossible; there must always be some slight difference, and any such difference will bring about a cumulative increase in the unbalance, as follows: A slight increase in the electrons drawn by plate 62 occurs. This increase causes an increase of the voltage drop across resistor 60, and thus a decrease of the voltage difference between plate 62 and cathode 74—i. e., the larger the voltage drop across resistor 60, the less positive plate 62 becomes. Because of condenser 70, the decrease in voltage of plate 62 is transferred through said condenser 70 to grid 66 and causes a decrease in the voltage difference between cathode 74 and said grid 66. This decrease of voltage on grid 66 causes a reduction in the electron flow through plate 61 and resistor 59. Thus the increase in conduction of the left half (plate 62 and resistor 60) must be accompanied by a decrease in conduction of the right half (plate 61 and resistor 59). In the same manner, the decrease of conduction through plate 61 and resistor 59 causes an increase of voltage on plate 61 (less voltage drop through resistor 59, therefore plate 61 becomes more positive) and hence of the grid voltage on grid 67, and results in an increase of electron flow through the left half of tube T5. Thus the slight initial unbalance sets up a cumulative, or regenerative switching action which ends with the conduction of the right half reduced to zero and the electron flow through the left half increased to a maximum value. Though described as if it occurred slowly, the switching action occurs with extreme rapidity—in a fraction of a micro second. In order that the right half of tube T5 be cut off, grid 66 had to be driven beyond the cut-off voltage. The negative grid voltage results from a charge on condenser 70. Since this charge must leak off through resistor 71 the grid voltage does not remain negative indefinitely, but tends to return to zero as the condenser discharges. As soon as cut-off is reached, electrons begin to flow through plate 61 and resistor 59, and a second switching action takes place. This switching action is like the first except that the conduction through the right half is increasing and that through the left decreasing. Thus it ends with the right half having maximum conduction and with the left half cut-off; that is, during the switching action the electron flow is suddenly transferred from one plate circuit to the other. This switching action repeats continuously. It thus can be seen that a square wave output may be taken off of either plate (61 or 62)—remembering, of course, that the output from each plate will be 180° out of phase with the other. It can also be seen that the components controlling the cut-off time of either half of tube T5 namely, resistors 68 and 71 and condensers 63 and 70, in effect determine the frequency of the square wave output. It should be mentioned that if resistor 68 equals resistor 71 and condenser 70 equals condenser 63 this square wave will be symmetrical.

From the foregoing it therefore follows that by varying either the resistance of capacitance in the two grid circuits of multivibrator tube T5 the natural free-running frequency may be changed. In the present embodiment the grid resistance is changed by adding resistance in parallel to resistors 71 and 68. As can easily be seen in the drawing, when any one of the counting relays is operated additional resistors are placed in parallel with resistors 71 and 68. As was mentioned hereinbefore the multivibrator does not function during the first round of pulses to the counting relays but responsive to the second operation of relay 120, and consequently contacts **124*b* and 125*b*, resistance 84 and 85 will be introduced into the grid circuits of the now operating multivibrator. Resistors 84 and 85 are so adjusted that when placed in parallel with resistors 68 and 71 respectively, the multivibrator produces a square wave of 16⅔ cycles per second. Responsive to the succeeding operation of relay 130, and consequently contacts 134*b* and 135*b* (relay 120 in the meantime having fallen back), resistors 86 and 87 will be placed in parallel with resistors 68 and 71 over contacts 134*b* and 124*a*, 135*b* and 125*a*. The multivibrator will therefore operate at 25 cycles per second. In a similar fashion it can be seen that operations of relays 140, 150 and 160 will change the operating frequency of the multivibrator to 33⅓, 50 and 66⅔. It should be understood that any other predetermined set of five frequencies could be used; or for that matter, with an increase in the number of counting relays, a larger set of any frequencies could be utilized. Resistors 84, 85, 86, 87, 88, 89, 90, 91, 92 and 93** are of the variable type so that a very fast calibration to another set of frequencies may be accomplished.

The output of the multivibrator, as was hereinbefore stated, consists of two identical square waves—180° out of phase. These two voltages excite the grids of the push-pull connected power amplifier. This arrangement cancels all even harmonic and even order combination frequencies in the output—as is well-known in the art—thereby permitting operation of power amplifier tubes T3 and T4 under conditions of high output per tube that would otherwise give excessive distortion. In addition, the push-pull arrangement avoids direct current saturation in the cores of the output transformer because the current in the two halves of the primary winding magnetize the core in opposite directions. Hum caused by the alternating filament current or ripple in the power supply voltage is also balanced out by the push-pull transformer connection. Because of this last-mentioned advantage the filtering circuit for the push-pull power amplifier stage consist only of choke 31 and filter condenser 46. It might be mentioned here that the power supply circuit for the power amplifier is also well-known—i. e., the full rectification type. Briefly explained during one half of the cycle the top of winding section 2 will, for example, be positive with respect to the center tap (between winding sections 2 and 3) and similarly the bottom of winding section 3 will be negative or rather less positive with respect to the center tap. In the present embodiment the number of turns on a winding 2 and 3 is such that there is a potential difference of 800 volts from the top of winding section 2 to the bottom of winding section 3. Electrons will therefore flow through the right halves of tubes T1 and T2 over the following path: from filaments 17 and 18, plates 14 and 16, winding section 2, conductor 30, condenser 46 (and of course out over the load), choke 31, winding 4 and 5 back to filaments 17 and 18. During the other half of the cycle, namely when the top of winding section 2 is negative with respect to the center tap and the bottom of winding section 3 is positive, also with respect to the center tap, the electron flow will be over the following path: filaments 17 and 18, plates 13 and 15, winding section 3, conductor 30, condenser 46 and the load, choke 31, winding 4 and 5 and back to filaments 17 and 18. It is therefore seen that the electron flow is always in the same direction through the load—resulting in a direct positive plate supply voltage appearing at point 97. It may be noted that a fixed positive voltage (however considerably less positive than point 97) appears at point 26 from the bleeder 64 and 65 and serves in a well-known fashion to give the power amplifier tubes T3 and T4 a proper fixed bias. This bias can of course be changed, and, as is well known, different classes of operation may be employed to secure different efficiencies. For example, in Class AB operation the instantaneous plate current is reduced to zero for a small portion of each cycle without causing excessive distortion in the output. This operation renders plate efficiencies of the order of 40 to 50 per second. Condenser 57 is provided in order to maintain that bias voltage fixed.

The plate supply voltage is applied to plates 32, 33, 40 and 42 of tubes T3 and T4 responsive to the closing of contacts 111 by the operation of time delay relay 110. The power amplifier thereby functions as such to supply the ringing circuits. A cycle of operation will now be considered. Assuming that the positive half cycle is placed on grids 38 and 41 through resistors 31′ and 37, the top halves of power amplifier tubes T3 and T4 will conduct over the following path: from the power supply to point 26, cathodes 34 and 44, plates 32 and 40, winding sections 47 and 49, center taps, contacts 111, point 97 and to the power supply. Simultaneously the same square wave, 180° out of phase i. e., negative, will be impressed on grids 39 and 43 through resistors 36 and 58. This negative voltage will, of course, prevent the bottom halves of tubes T3 and T4 from conducting as much as the top halves and may, if so biased that they are driven below the cut-off value, cease conduction entirely. The conduction, if any, will flow over the following path: from the power supply to point 26, cathodes 34 and 44, plates 33 and 42, winding sections 50 and 48, center taps, contacts 111, point 97 and to the power supply. Thus it can be seen that during that particular half cycle there will be a considerable difference in the electron flow of the two halves of each tube and it therefore follows that the tops of winding sections 47 and 49 will be at a considerably lower voltage than the bottom of winding sections 48 and 50. This voltage difference will of course be transferred to the secondary winding. The other half of the square wave cycle considered will, of course, effect a voltage difference transferred to the secondary 180° out of phase with the previously described half cycle. Resistors 31', 36, 37 and 58 in the grid circuits of the power amplifier are provided in order to prevent any grid current from affecting the frequency of the multivibrator.

The counting relays also connect the output of the power amplifier to the particular ringing circuit corresponding to the frequency the multivibrator is oscillating at. Assuming relay 120 is operated, and therefore the multivibrator is producing 16⅔ cycles per second and, of course, the power amplifier is amplifying at 16⅔ cycles per second, frequency contacts 122 and 123 will be operated to impress the output from winding section 51 across the correct 16⅔ cycles per second ringing circuit. Similarly during the succeeding operation of relay 130 the output from winding sections 51 and 52 will be impressed across the 25 cycles per second output circuit through contacts 121, 132 and 133. The circuits to the remaining ringing circuits are obvious and require no further discussion. It will be noted that the output voltage is increased somewhat (by the addition of turns 52, 53, 54 and 55) as the frequency increases. This feature compensates for the additional line inductance losses that, of course, increase with frequency. The voltage therefore impressed across each individual ringer in the entire system will be essentially equal.

The more or less isolated position of the multivibrator from the output circuits, effected by the well known "buffer" characteristic of the power amplifier, renders a very good frequency response over a varying load. The particular tubes utilized in this embodiment draw less than half their rated plate current when delivering 500 milliamperes to any ringing circuit—such output considered adequate for a large telephone exchange. It can therefore be seen that the removal or burning out of one of the tubes in parallel will not cut off the service. It has also been found that such an arrangement renders very good voltage regulation over a varying load.

While there has been described what is at present considered to be the preferred embodiment of the invention it will be understood that various modifications may be made herein and it is intended to cover in the appended claims all such modifications as fall within the true spirit and scope of the invention.

Having described my invention in detail, what I claim and desire to be protected by issuance of Letters Patent of the United States is:

1. A pulsing arrangement for supplying pulses to a counting circuit, comprising a pulsing relay, a conducting tube having a control grid, and an anode, a voltage source, a first condenser normally connected across said voltage source and charged thereby, a circuit for energizing said relay including said anode and said voltage source, said pulsing relay energized upon conduction of said tube, a second condenser connected to said control grid, means controlled by the energization of said relay for connecting said control grid and said second condenser to a negative terminal of said voltage source, said second condenser charged thereby, means also controlled by the energization of said relay for disconnecting said charged first condenser from said voltage source and connecting said charged first condenser to said counting circuit to transmit a pulse thereover, means further controlled by the energization of said pulsing relay for opening said energizing circuit to thereby interrupt said conduction of said tube and deenergize said relay, and means for thereafter discharging said second condenser to thereby maintain a negative potential on said grid for a predetermined interval thereby maintaining said tube non-conducting during said interval.

2. A pulsing arrangement for supplying pulses to a counting circuit, comprising a conducting tube having a control grid and an anode, a pulsing relay, a voltage source, a condenser normally connected across said voltage source and charged thereby, a circuit for energizing said relay including said anode and said voltage source, said pulsing relay energized upon conduction of said tube, means controlled by the energization of said pulsing relay for sequentially applying a negative potential from said voltage source to said control grid; for disconnecting said charged condenser from said voltage source and connecting said condenser to said counting circuit to thereby discharge said condenser thereover and opening said circuit thereby causing said tube to cease conducting and deenergizing said relay, means connected to said control grid of said tube to maintain said applied negative potential on said grid for a predetermined duration of time thereby maintaining said tube deenergized for a definite period.

3. A pulsing arrangement for supplying pulses to a user circuit comprising a conducting tube having a control grid, control means, a source of positive potential, a circuit for energizing said control means including said tube and said source of positive potential, said control means energized responsive to conduction of said tube, a source of negative potential, a condenser normally connected to said source of positive potential and charged thereby, means operated responsive to said energization of said control means to sequentially connect said source of negative potential to said control grid, connect said charged condenser to said user circuit, and open said energizing circuit to thereby interrupt said conduction of said tube, timing means connected to said control grid for maintaining a negative potential from said negative potential source on said control grid for a predetermined interval thereby preventing conduction of said tube for said predetermined interval.

4. A pulsing device for supplying pulses to a user circuit comprising a voltage source, a condenser normally connected across said voltage source and charged thereby, a conducting tube having a control grid, said tube normally connected across said voltage source, means operated responsive to the conduction of said tube for connecting a negative terminal of said voltage source to said control grid, said control grid thereby acquiring a negative potential, means operated responsive to the conduction of said tube for disconnecting said charged condenser from said voltage source and connecting said condenser to said user circuit, and means operated responsive to the conduction of said tube for disconnecting said tube from said voltage source thereby interrupting conduction of said tube, timing means associated with said control grid for maintaining said negative potential on said control grid for only a predetermined interval, said tube thereby prevented from conduction for said interval.

References Cited in the file of this patent

UNITED STATES PATENTS

| | | |
|---|---|---|
| 1,105,492 | Clement | July 14, 1914 |
| 1,904,929 | Richardson | Apr. 18, 1933 |
| 1,957,672 | Saunders | May 8, 1934 |
| 2,122,499 | Stocker | July 5, 1938 |
| 2,168,198 | Frink | Aug. 1, 1939 |
| 2,188,159 | Rockwood | Jan. 23, 1940 |
| 2,359,967 | Brown | Oct. 10, 1944 |
| 2,583,792 | Nelson | Jan. 29, 1952 |
| 2,600,729 | Boyer | June 17, 1952 |